(12) United States Patent
Tseng

(10) Patent No.: US 11,841,537 B2
(45) Date of Patent: Dec. 12, 2023

(54) DUST-PROOF ADAPTER

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

(*) Notice: Subject to any disclaimer, the term of this patent is extended or adjusted under 35 U.S.C. 154(b) by 17 days.

(21) Appl. No.: 17/324,133

(22) Filed: May 19, 2021

(65) Prior Publication Data

US 2022/0299715 A1 Sep. 22, 2022

(30) Foreign Application Priority Data

Mar. 21, 2021 (TW) .................................. 110110122

(51) Int. Cl.
*G02B 6/38* (2006.01)

(52) U.S. Cl.
CPC ......... *G02B 6/3849* (2013.01); *G02B 6/3825* (2013.01); *G02B 6/3847* (2013.01); *G02B 6/3894* (2013.01)

(58) Field of Classification Search
CPC .. G02B 6/3849; G02B 6/3825; G02B 6/3891; G02B 6/3894; G02B 6/3847
See application file for complete search history.

(56) References Cited

U.S. PATENT DOCUMENTS

| | | | | |
|---|---|---|---|---|
| 7,090,406 B2* | 8/2006 | Melton | ................ | G02B 6/3869 385/80 |
| 7,090,407 B2* | 8/2006 | Melton | ................ | G02B 6/4429 385/62 |
| 7,568,844 B2* | 8/2009 | Luther | ................ | G02B 6/3889 385/60 |
| 7,614,799 B2* | 11/2009 | Bradley | ................ | G02B 6/545 385/84 |
| 9,395,499 B2* | 7/2016 | Huang | ................ | G02B 6/3874 |
| 10,444,443 B2* | 10/2019 | Coenegracht | ........ | G02B 6/3849 |
| 2006/0204178 A1* | 9/2006 | Theuerkorn | ......... | G02B 6/3831 385/59 |

FOREIGN PATENT DOCUMENTS

| | | | | |
|---|---|---|---|---|
| WO | WO-2009073500 A1 * | 6/2009 | ........... | G02B 6/3817 |
| WO | WO-2015022402 A1 * | 2/2015 | ......... | B65D 43/0277 |

* cited by examiner

*Primary Examiner* — Ryan A Lepisto
*Assistant Examiner* — Erin D Chiem

(57) ABSTRACT

The present invention provides a dust-proof adapter comprising an adapter body, a flexible element, and a cap, wherein the adapter body has an opening at a coupling side and a ring-shaped surface surrounding the first opening, the flexible element is arranged onto the ring-shaped surface, and the cap detachably covers the adapter body for protecting the first opening. When the cap is covered on the first opening, the cap applies an action force along an axial direction of the adapter body on the flexible element thereby achieving air-tight and dust-proof effect.

7 Claims, 4 Drawing Sheets

DUST-PROOF ADAPTER

CROSS-REFERENCE TO RELATED APPLICATION

This application claims the benefit of Taiwan Patent Application No. 110110122, filed on Mar. 21, 2021, in the Taiwan Intellectual Property Office of the R.O.C, the disclosure of which is incorporated herein in its entirety by reference.

FIELD OF INVENTION

The present invention relates to a dust-proof adapter. In particular, it relates to a dust-proof adapter for coupling with an optical connector.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

As shown in FIG. 1, which is a schematic diagram of the dust-proof adapter used to couple with the optical connector in conventional technology. The function of the outer cap 16 of the dust-proof adapter 1 is to completely cover the connector interface 10A of the adapter body 10. The O-ring 12 prevents dust from entering. The fastening element 14 is used to compress the O-ring 12 and also serves as a locking element. The conventional technology shown in FIG. 1 requires three elements, the outer cap 16, the O-ring 12, and the fastening element 14, to fasten the O-ring 12 to form a dust-proof cover to achieve the dust-proof effect. The use of multiple elements to form the dust-proof cover sometimes causes troubles in application. In addition, the outer cap 16 must be made of a soft material, which causes a lot of trouble during installation, and it is not easy to fit into the outer diameter of the connector interface 10A.

In summary, it is necessary for a dust-proof adapter to solve the shortcomings of conventional technologies.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a dust-proof adapter having a cap to achieve the dust-proof effect, wherein the adapter body has a flexible element. The cap applies an action force on the flexible element along the axial direction of the adapter body to produce air-tight and dust-proof effect. The present invention simplifies the number of elements required for the dust-proof effect, reduces the manufacturing cost, and simplifies the inconvenience in operation.

The present invention provides a dust-proof adapter having a cap to achieve the dust-proof effect. The cap not only has a buckle structure that rotates to achieve the locking effect, but also has an elastic positioning structure as a second locking mechanism. After the cap is locked by rotation, the buckle structure is embedded into the locking groove of the adapter body to further achieve the locking effect. The second locking mechanism may prevent the user from taking the cap away accidently when rotating and opening the cap, so as to avoid the cap from falling off due to accident.

The present invention provides a dust-proof adapter, comprising: an adapter body, having a first opening on a coupling side, a ring-shaped surface disposed around the first opening; a cap, detachably connected to the adapter body to protect the first opening; and a flexible element, disposed in the cap, wherein when the cap covers on the first opening, the flexible element is leaned against the ring-shaped surface, and the cap applies an action force on the flexible element along axial direction of the adapter body.

In one embodiment of the present invention, the adapter body has a lateral surface connected to the ring-shaped surface, and a plurality of first buckle structures are disposed on the lateral surface.

In one embodiment of the present invention, the cap has an accommodation space, and an inner wall of the accommodation space has a plurality of second buckle structures corresponding to the plurality of first buckle structures.

In one embodiment of the present invention, the each first buckle structure has a notch and a buckle groove, which is connected to the notch and has a bending angle; after the each second buckle structure is embedded into the corresponding notch, the cap moves the second buckle structure to the corresponding buckle groove by rotating movement to make the cap fix on the adapter body.

In one embodiment of the present invention, the cap has at least one positioning structure; after the second buckle structure moves to the corresponding buckle groove, the each positioning structure is embedded into the notch of the first buckle structure.

In one embodiment of the present invention, the cap has at least one second opening, the positioning structure is disposed into the each second opening and has a cantilever and a positioning protrusion, an end of the cantilever is connected to a wall surface of the second opening, and another end of the cantilever is connected to the positioning protrusion; after the second buckle structure moves to the corresponding buckle groove, the positioning protrusion is embedded into the corresponding notch.

In one embodiment of the present invention, the lateral surface has a guiding structure for guiding the positioning protrusion to the notch when the cap rotates.

In one embodiment of the present invention, the guiding structure has a guiding groove and a guiding inclined surface, the guiding groove accommodates the positioning protrusion, and the guiding inclined surface is connected to a side of the guiding groove to guide the positioning protrusion to the notch.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1:
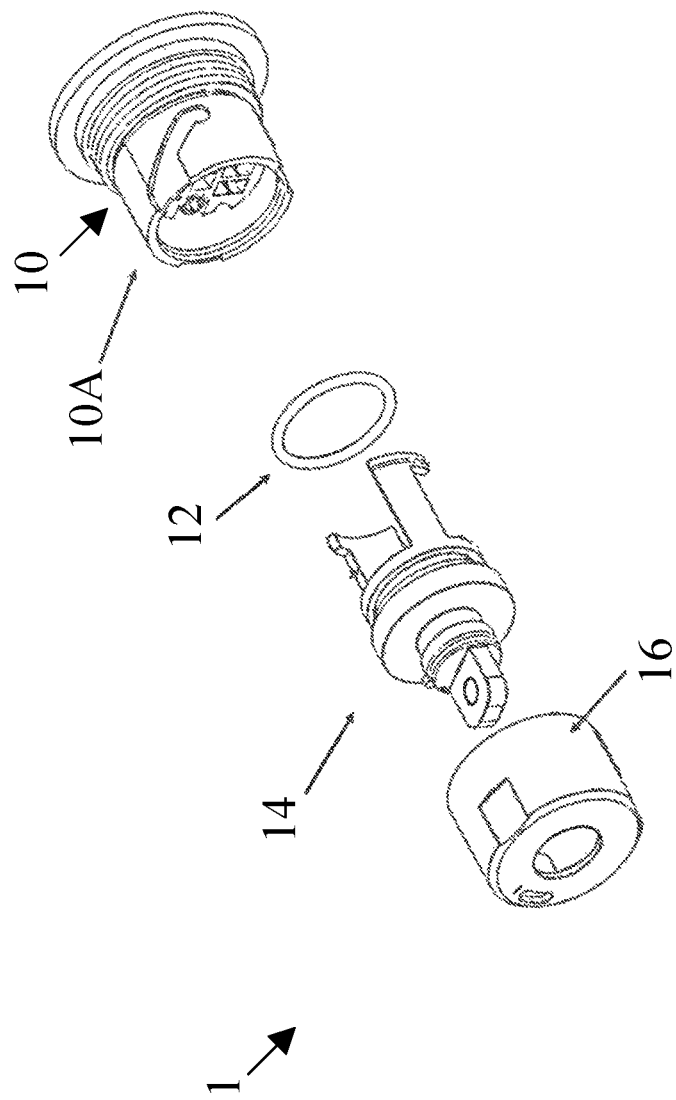
FIG. 1 is a schematic diagram of the dust-proof adapter used to couple with the optical connector in conventional technology.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a dust-proof adapter and to aid it of skilled in the art in practicing this invention. These embodiments are merely exemplary embodiments and in no way to be considered to limit the scope of the invention in any manner.

Figure 2:
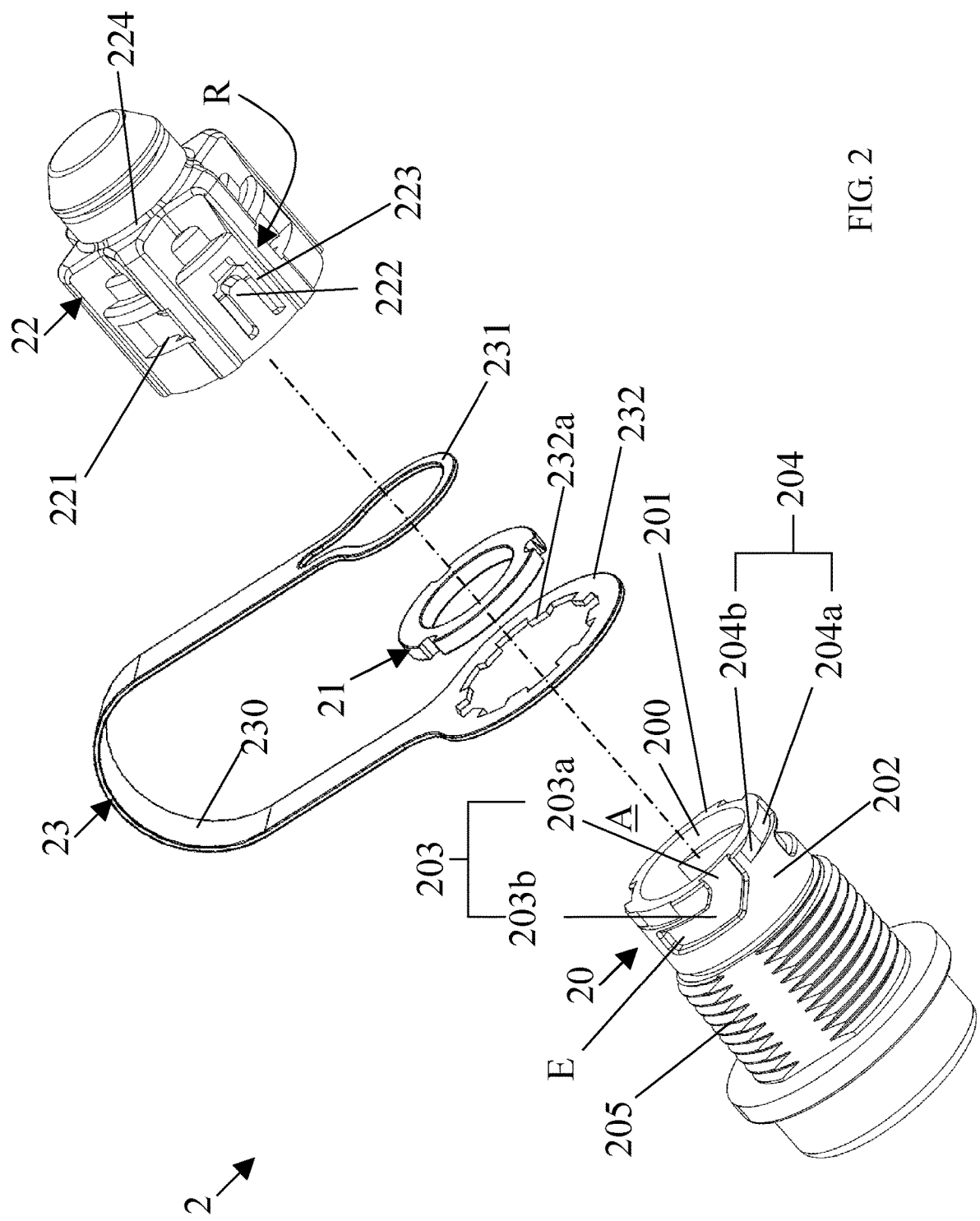
FIG. 2 is a three-dimensional and exploded schematic diagram of an embodiment of the dust-proof adapter in the present invention.
Figure 3B:
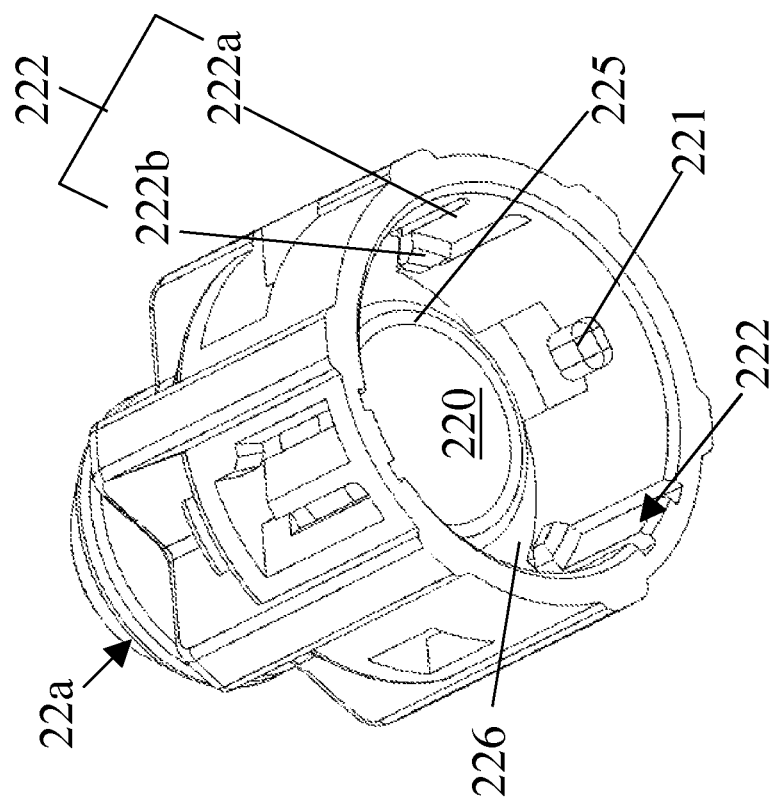
FIG. 3B is a three-dimensional schematic diagram of another embodiment of the cap in the present invention.
Figure 3A:
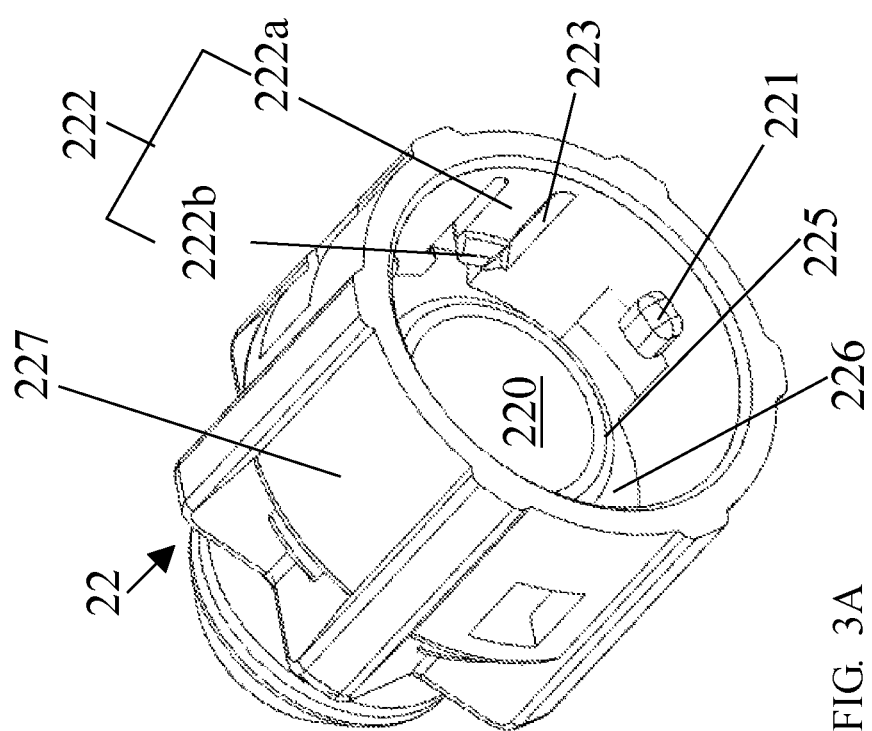
FIG. 3A is a three-dimensional schematic diagram of an embodiment of the cap in the present invention.

Please refer FIGS. 2A and 3B, in which FIG. 2 is a three-dimensional and exploded schematic diagram of an embodiment of the dust-proof adapter in the present invention, and FIG. 3 is a three-dimensional schematic diagram of an embodiment of the cap in the present invention. In this embodiment, the dust-proof adapter 2 includes an adapter body 20, a flexible element 21 and a cap 22. The adapter body 20 is disposed on the housing of the communication device, and the first opening 200 has a coupling interface connected to the optical connector for transmitting signals. The coupling interface and the optical connector are conventional technologies, and would not be described herein. The adapter body 20 has a first opening 200 on the coupling side A for inserting an optical connector, and a ring-shaped surface 201 is disposed around the first opening 200.

The cap 22 is detachably combined with the adapter body 20 to protect the first opening 200. In one embodiment, the cap 22 has an accommodation space 220 with a protruding portion 225, and the protruding portion 225 and the annular cover 227 of the cap 22 have a bearing surface 226 between the inner walls of the accommodation space 220. The bearing surface 226 is used to bear the flexible element 21. In one embodiment, the flexible element is an O-ring, which provides an air-tight effect. When the cap 22 covers the first opening 200, the flexible element 21 is leaned against the ring-shaped surface 201, and the cap 22 applies an action force on the flexible element 21 along the axial direction of the adapter body 20 to make the flexible element 21 produce the air-tight and dust-proof effect.

The cap 22 and the adapter body 20 may be designed as a locking structure, so that the cap 22 and the adapter body 20 may be combined and locked to firmly protect the first opening 200. In this embodiment, the adapter body 20 has a lateral surface 202 which is arranged in the circumferential direction of the adapter body 20 and is connected to the ring-shaped surface 201. The lateral surface 202 has a first buckle structure 203, and the inner wall of the accommodation space 220 in the cap 22 has a plurality of second buckle structures 221 corresponding to the first buckle structure 203. The second buckle structure 221 may be buckled with the corresponding first buckle structure 203 by rotating the cap 22. It should be noted that the number of the first buckle structure 203 and the second buckle structure 221 is not limited, and at least one of those can be put into practice.

The first buckle structure 203 on the lateral surface 202 is a groove structure with a turning angle, which includes a notch 203a and a buckle groove 203b, which is connected to the notch 203a and has a bending angle. Each second buckle structure 221 is a convex structure in this embodiment. After the second buckle structure 221 is inserted into the corresponding notch 203a, the cap 22 moves the second buckle structure 221 to the position of the groove end E of the corresponding buckle groove 203b by rotating movement R to fix the cap 22 on the adapter body 20.

In this embodiment, in addition to the first locking mechanism formed by the first buckle structure 203 and the second buckle structure 221 between the cap 22 and the adapter body 20, there is a second locking mechanism to prevent the cap 22 from being detached from the adapter body 20 by the incorrect operation. The second locking mechanism of this embodiment includes at least one positioning structure 222, which is embedded into the corresponding notch 203a after the second buckle structure 221 moves to the corresponding buckle groove 203b. In this embodiment, the cap 22 forms at least one second opening 223 on the annular cover 227, and each second opening 223 has a positioning structure 222. The positioning structure 222 has a cantilever 222a and a positioning protrusion 222b, wherein one end of the cantilever 222a is connected to the wall surface of the second opening 223, and the free end of the cantilever 222a is connected to the positioning protrusion 222b. After the second buckle structure 221 moves to the corresponding buckle groove 203b, the positioning protrusion 222b is embedded into the corresponding notch 203a.

In the embodiment of the adapter body 20 shown in FIG. 2, one side of the first buckle structure 203 has a guiding structure 204 for guiding the positioning protrusion 222b of the positioning structure 222 to the notch 203a when the cap 22 performs a rotating movement R. The guiding structure 204 further has a guiding groove 204a and a guiding inclined surface 204b. When the cap 22 covers on the adapter body 20 to close the first opening 200, the guiding groove 204a may accommodate the positioning protrusion 222b. The guiding inclined surface 204b is connected to one side of the guiding groove 204a. One end of the guiding inclined surface 204b extends from the bottom surface of the guiding groove 204a to the lateral surface 202 at a predetermined inclination angle, and is eventually connected to the lateral surface 202.

When the cap 22 performs a rotating movement R, the positioning protrusion 222b contacts the guiding inclined surface 204b along with the rotating movement R. Since the positioning protrusion 222b is connected to the cantilever 222a, the positioning protrusion 222b is guided to follow the height change of the guiding inclined surface 204b by the rotating movement R, and the cantilever 222a is pushed out by the flexibility of the cantilever 222a. When the cap 22 rotates to be positioned, the positioning protrusion 222b rebounds into the notch 203a by the elastic force of the cantilever 222a, resulting in a locking effect. It should be noted that the number of positioning structures 222 is one in FIG. 3A. However, the number of positioning structures 222 is less than or equal to the number of first buckle structures 203. In another embodiment, as shown in FIG. 3B, the number of positioning structures 222 in the cap 22a is three, and they are averagely arranged around the annular cover 227 of the cap 22a at intervals of 120 degrees.

Please refer to FIG. 2, in order to allow the cap 22 to be easily covered on the adapter body 20, the present embodiment further has a flexible connector 23, which has a flexible belt 230, a first case 231, and a second case 232. The first case 231 and the second case 232 are connected to both ends of the flexible belt 230. The first case 231 is an annular structure and disposed on the groove 224 on the outer surface of the cap 22. The second case 232 is a ring-shaped case with teeth, and is sleeved at the junction between the lateral surface 202 of the adapter body 20 and the threaded area 205. The sawtooth structure 232a of the second case 232 is in contact with the wall surface of the adapter body 20 to result in a fixing effect, so that the flexible connector 23 is not taken away easily.

Figure 4:
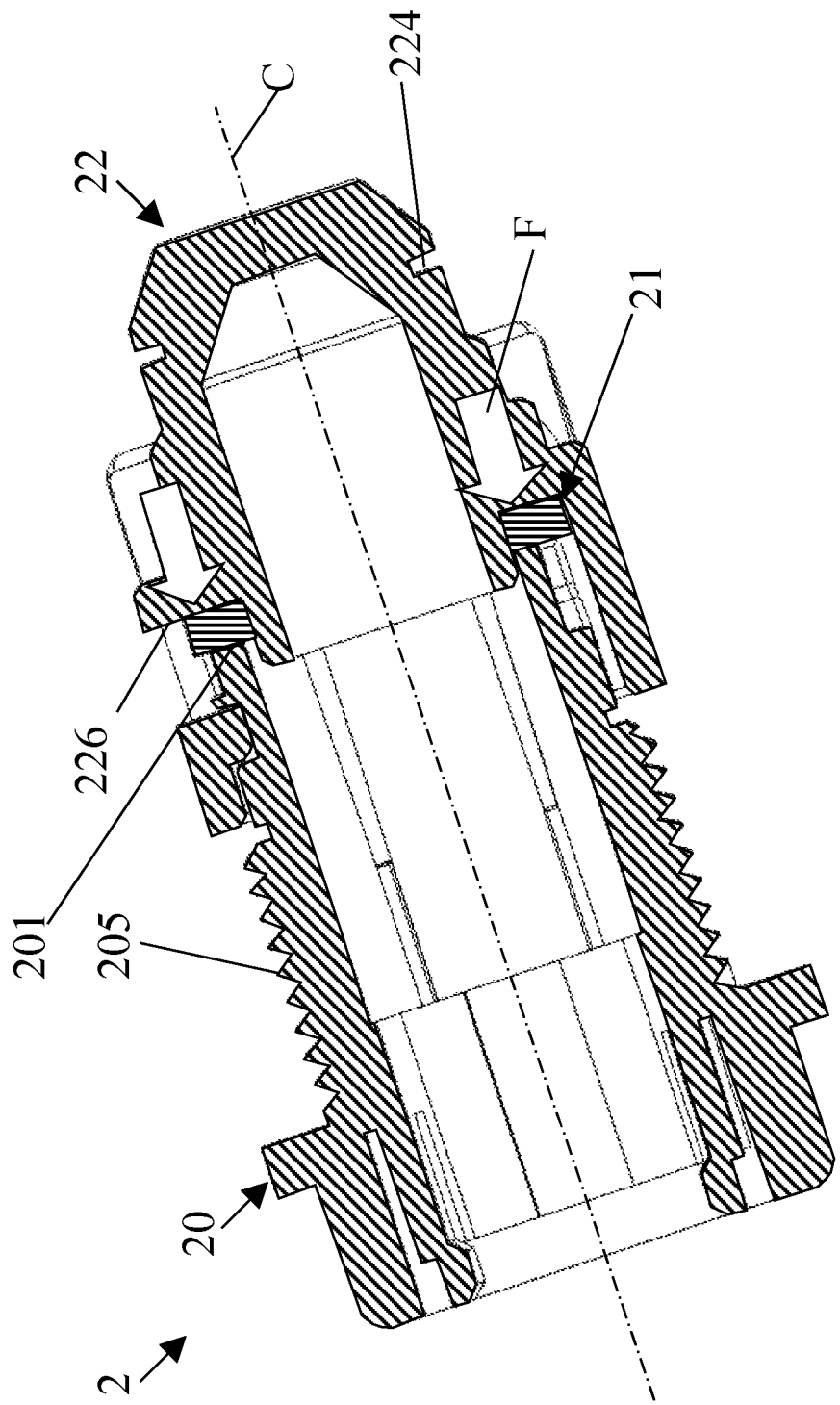
FIG. 4 is a cross-sectional schematic diagram of the dust-proof adapter in the present invention.

Please refer to FIG. 4, which is a cross-sectional schematic diagram of the dust-proof adapter in the present invention. When the cap 22 is locked on the adapter body 20 by the rotating movement R, the flexible element 21 contacts the ring-shaped surface 201. When the cap 22 is locked to the adapter body 20, the bearing surface 226 applies a force F on the flexible element 21 along the direction of the central axis C of the adapter body 20, so that the flexible element 21 between the cap 22 and the adapter body 20 achieves a completely airtight effect, thereby avoiding dust or dirt from polluting the inside of the adapter body 20.

It should be noted that the present invention is able to achieve the effect of sealing the adapter only by using the two elements, which are the cap 22 and the flexible element 21. The present invention eliminates the need for the fastening element 14 of FIG. 1 and saves the need for element manufacturing.

In addition, the cap of the present invention not only has a buckle structure that rotates to achieve the locking effect, but also has an elastic positioning structure used as a second locking mechanism. After the cap is locked by rotation, the elastic buckle structure is embedded into the buckle groove of the adapter body to achieve a further locking effect. The second locking mechanism is able to make it difficult for the user to take the cap away when rotating and opening the cap, so as to prevent the cap from falling off.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A dust-proof adapter, comprising:
    an adapter body, having a first opening on a coupling side, a ring-shaped surface disposed around the first opening, and a threaded area;
    a cap, having a groove on an outer surface of the cap, detachably connected to the adapter body to protect the first opening;
    a flexible element, disposed in the cap; and
    a flexible connector, having a flexible belt, a first case, and a second case,
    wherein when the cap covers on the first opening, the flexible element is leaned against the ring-shaped surface, and the cap applies an action force on the flexible element along axial direction of the adapter body,
    wherein the adapter body has a lateral surface connected to the ring-shaped surface, a plurality of first buckle structures are disposed on the lateral surface, and the each first buckle structure has a notch and a buckle groove, the buckle groove is connected to the notch and has a bending angle, and the buckle groove and the notch are integrally formed,
    wherein the first case and a second case are connected to both ends of the flexible belt, the first case is disposed on the groove, and the second case is sleeved between the lateral surface and the threaded area.

2. The dust-proof adapter of claim 1, wherein the cap has an accommodation space, and an inner wall of the accommodation space has a plurality of second buckle structures corresponding to the plurality of first buckle structures.

3. The dust-proof adapter of claim 2, wherein after the each second buckle structure is embedded into the corresponding notch, the cap moves the second buckle structure to the corresponding buckle groove by rotating movement to make the cap fix on the adapter body.

4. The dust-proof adapter of claim 3, wherein the cap has at least one positioning structure; after the second buckle structure moves to the corresponding buckle groove, the each positioning structure is embedded into the corresponding notch.

5. The dust-proof adapter of claim 4, wherein the cap has at least one second opening, the positioning structure is disposed into the each second opening and has a cantilever and a positioning protrusion, an end of the cantilever is connected to a wall surface of the second opening, and another end of the cantilever is connected to the positioning protrusion; after the second buckle structure moves to the corresponding buckle groove, the positioning protrusion is embedded into the corresponding notch.

6. The dust-proof adapter of claim 5, wherein the lateral surface has a guiding structure for guiding the positioning protrusion to the notch when the cap rotates.

7. The dust-proof adapter of claim 6, wherein the guiding structure has a guiding groove and a guiding inclined surface, the guiding groove accommodates the positioning protrusion, and the guiding inclined surface is connected to a side of the guiding groove to guide the positioning protrusion to the notch.

\* \* \* \* \*